(12) United States Patent
Musashi et al.

(10) Patent No.: US 8,796,386 B2
(45) Date of Patent: Aug. 5, 2014

(54) THIOCARBONYL COMPOUND AND PROCESS FOR PRODUCING POLYMER USING SAME AND THAT POLYMER

(75) Inventors: Naoki Musashi, Namerikawa (JP);
Atsushi Shibata, Namerikawa (JP);
Noboru Yamagata, Namerikawa (JP)

(73) Assignee: Nippon Carbide Industries Co., Ltd., Tokyo (JP)

( * ) Notice: Subject to any disclaimer, the term of this patent is extended or adjusted under 35 U.S.C. 154(b) by 286 days.

(21) Appl. No.: 13/138,868

(22) PCT Filed: Apr. 13, 2010

(86) PCT No.: PCT/JP2010/056891
§ 371 (c)(1),
(2), (4) Date: Jan. 5, 2012

(87) PCT Pub. No.: WO2010/119970
PCT Pub. Date: Oct. 21, 2010

(65) Prior Publication Data
US 2012/0108757 A1    May 3, 2012

(30) Foreign Application Priority Data
Apr. 13, 2009 (JP) ................................. 2009-097308

(51) Int. Cl.
*C08F 265/06* (2006.01)
*C07C 327/36* (2006.01)
(52) U.S. Cl.
USPC ........................... 525/261; 525/303; 525/309
(58) Field of Classification Search
USPC ........................................ 525/261, 303, 309
See application file for complete search history.

(56) References Cited

U.S. PATENT DOCUMENTS

| 8,513,172 B2 * | 8/2013 | Baum et al. .................... 508/469 |
| 2004/0171765 A1 | 9/2004 | Tsuji et al. |
| 2004/0171777 A1 | 9/2004 | Le et al. |

FOREIGN PATENT DOCUMENTS

| JP | 2000-515181 A | 11/2000 |
| JP | 2002-265508 A | 9/2002 |
| JP | 2002-363246 A | 12/2002 |
| JP | 2003-012719 A | 1/2003 |
| JP | 3639859 B2 | 1/2005 |
| WO | WO 98/01478 A1 | 1/1998 |

OTHER PUBLICATIONS

International Search Report mailed on Aug. 3, 2010.

* cited by examiner

*Primary Examiner* — Robert D. Harlan
(74) *Attorney, Agent, or Firm* — Rader, Fishman & Grauer PLLC

(57) ABSTRACT

A thiocarbonyl compound represented by the following formula (a) is useful as a RAFT agent. By using this, a process for producing a polymer having a excellent reactivity or monomer conversion rate and its polymer are provided. In the following formula (a), n indicates 1 to 6, and Z indicates an organic group selected from a substituted or unsubstituted aryl or a substituted or unsubstituted heteroaryl 5 Claims, 3 Drawing Sheets

THIOCARBONYL COMPOUND AND PROCESS FOR PRODUCING POLYMER USING SAME AND THAT POLYMER

TECHNICAL FIELD

The present invention relates to a thiocarbonyl compound and a process for producing a polymer using the same and that polymer, more particularly relates to a thiocarbonyl compound represented by the following formula (a) and a process for producing a polymer using the same and that polymer.

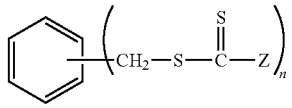
(a)

In the formula (a), n is 1 to 6, and Z is an organic group selected from a substituted or unsubstituted aryl, a substituted or unsubstituted heteroaryl.

It is known that a thiocarbonyl compound can be utilized as a reversible addition-cleavage chain transfer (RAFT) agent. The polymerization method using a RAFT agent is a living radical polymerization which features easy control of the number-average molecular weight and weight-average molecular weight and gives a polymer having a narrow molecular weight distribution. Further, it is reported that, by controlling the type of monomers or the method of addition of monomers, homopolymers, random copolymers and block copolymers can be produced (see Patent Literature 1). However, the polymerization method described in Patent Literature 1 has the problem of a slow reaction rate and low conversion rate of monomers.

LIST OF PRIOR ART

Patent Literature

Patent Literature 1: Japanese Patent No. 639859

SUMMARY OF INVENTION

Technical Problem

The present invention provides a thiocarbonyl compound useful as a RAFT agent. Further, the present invention provides a process for producing a polymer which is excellent in reactivity or conversion rate of monomers by use of the thiocarbonyl compound and its polymer. Further, the present invention provides a composition for adhesive use or bonding use which contains the above polymer.

Means for solving Problem

The inventors engaged in intensive studies and, as a result, found that a thiocarbonyl compound represented by the following formula (a) is useful as a RAFT agent.

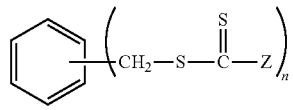
(a)

In the formula (a), n is 1 to 6, and Z is an organic group selected from a substituted or unsubstituted aryl, a substituted or unsubstituted heteroaryl.

Further, the inventors found that a process for producing a polymer characterized by comprising the following (1) to (3) in a reaction system is excellent in reactivity or conversion rate of monomers:
(1) radical polymerizable monomer
(2) radical generator
(3) thiocarbonyl compound represented by the following formula (a).

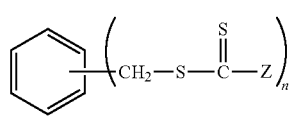
(a)

In the formula (a), n is 1 to 6 and Z is an organic group selected from a substituted or unsubstituted aryl or a substituted or unsubstituted heteroaryl.

The inventors further found that, by using the above production process of a polymer, a polymer represented by the following formula (b) is obtained:

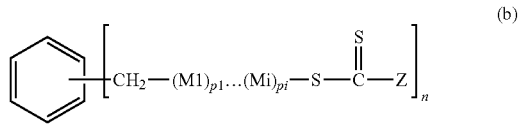
(b)

In the formula (b), i is 2 or more, n is 1 to 6, Mi is repeating units derived from the same or different radical polymerizable monomer and pi is each independently 1 or more and showing a degree of polymerization of the repeating units Mi. Z is an organic group selected from substituted or unsubstituted aryl, substituted or unsubstituted heteroaryl.

Further, the inventors found that the composition for adhesive use or bonding use comprising the polymer represented by the above formula (b) exhibits superior characteristics. That is, the inventors found that a composition comprising the polymer represented by the above formula (b) exhibits a high cohesion strength, high adhesive strength or high bonding strength, compared with a composition containing a linear polymer having the same molecular weight.

DESCRIPTION OF EMBODIMENTS

Figure 1:
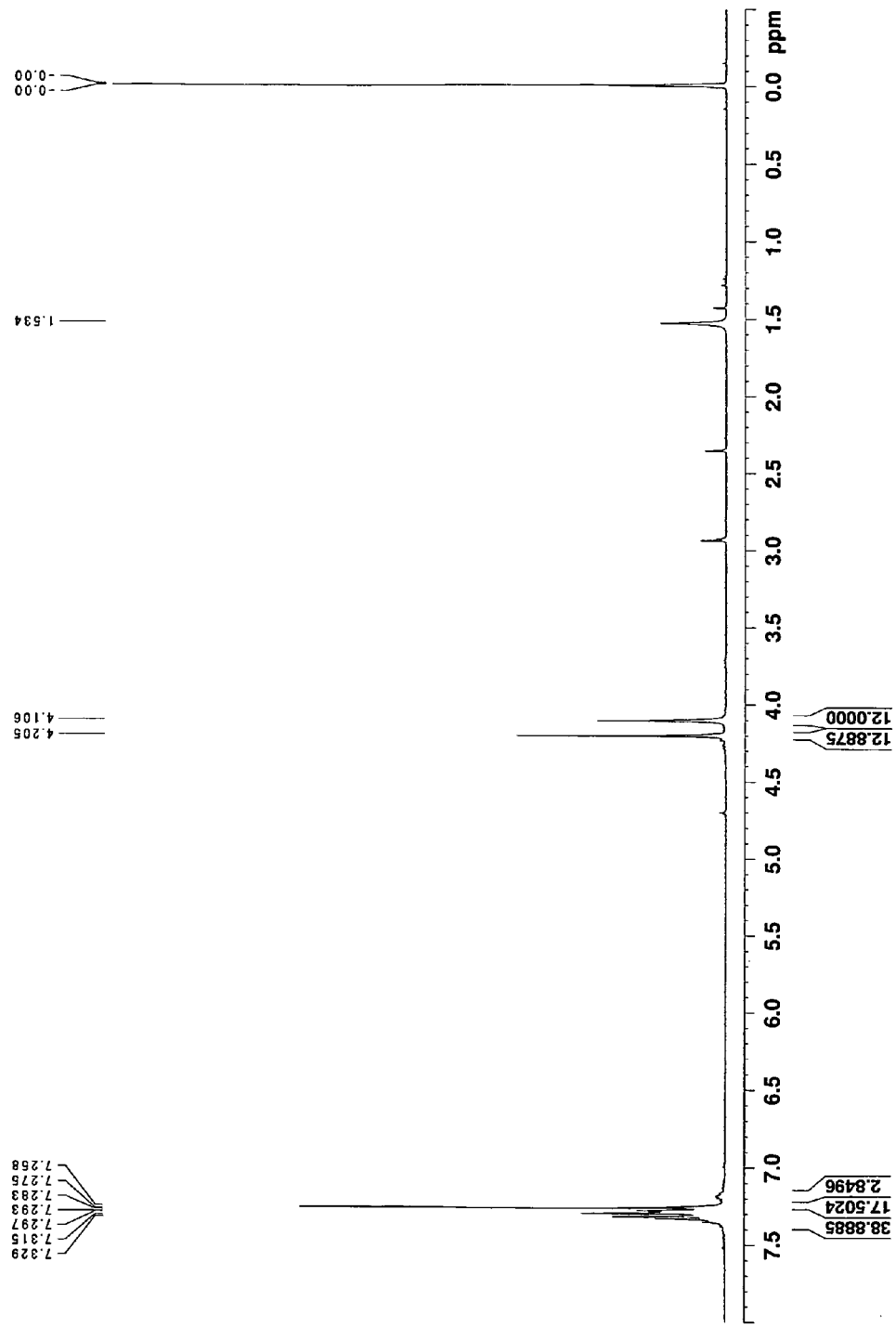
FIG. 1 is the results of $^1$HNMR measurement of a RAFT agent 1 obtained in Synthesis Example 1.

The thiocarbonyl compound of the present invention is represented by the following formula (a):

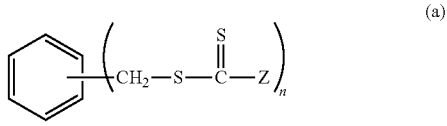

(a)

In the formula (a), n is 1 to 6 and Z is an organic group selected from a substituted or unsubstituted aryl, a substituted or unsubstituted heteroaryl.

The substituent Z of the thiocarbonyl compound represented by the above formula (a) is an organic group selected from substituted or unsubstituted aryl, substituted or unsubstituted heteroaryl. When using the thiocarbonyl compound in the present invention as a RAFT agent, if considering the reactivity or conversion rate of the monomer, the substituent Z is preferably substituted or unsubstituted aryl, more preferably substituted or unsubstituted benzyl.

When using the thiocarbonyl compound of the present invention for the production of a polymer, it is possible to control the number of thiocarbonyl groups to produce a chain or branched polymer. That is, by controlling the number of n in the above formula (a), it is possible to produce a chain or branched polymer.

When utilizing the polymer of the present invention for a composition for adhesive use or bonding use, from the viewpoint of the cohesion strength or bonding strength, it is preferable to use a thiocarbonyl compound represented by the above (a) where n is 4 to 6 to produce a polymer. More preferably, it is preferable to use a thiocarbonyl compound represented by the above (a) where the n is 5 or 6 to produce a polymer, particularly preferable to use a thiocarbonyl compound represented by the above (a) where the n is 6, to produce a polymer. Due to this, the composition using a polymer of the present invention exhibits a higher cohesion strength and gives a higher adhesive strength or higher bonding strength compared with a composition using a linear polymer of the same molecular weight.

The production process of a polymer of the present invention is characterized by comprising the following (1) to (3) in a reaction system:
(1) radical polymerizable monomer
(2) radical generator
(3) thiocarbonyl compound represented by following formula (a).

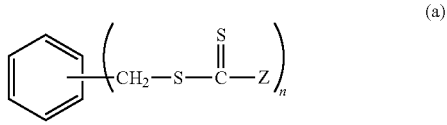

(a)

In the formula (a), n is 1 to 6 and Z is an organic group selected from a substituted or unsubstituted aryl, a substituted or unsubstituted heteroaryl.

As the monomers usable in the production process of a polymer of the present invention, radical polymerizable monomers may be used. The radical polymerizable monomer may be selected from substituted or unsubstituted styrene, substituted or unsubstituted alkyl acrylate, substituted or unsubstituted alkyl methacrylate, acrylonitrile, N-alkyl alkylamide, N-alkyl methacrylamide, N,N-dialkyl acrylamide, N,N-dialkyl methacrylamide, isoprene, butadiene, ethylene, vinyl acetate and combinations thereof. As detailed examples of the radical polymerizable monomers, methyl methacrylate, ethyl methacrylate, propyl methacrylate (including all isomers), butylmethacrylate (including all isomers), 2-ethylhexyl methacrylate, isobornyl methacrylate, methacrylic acid, benzyl methacrylate, phenyl methacrylate, methacrylonitrile, α-methyl styrene, methyl acrylate, ethyl acrylate, propyl acrylate (including all isomers), butylacrylate (including all isomers), 2-ethylhexyl acrylate (2EHA), isobornyl acrylate, acrylic acid, benzyl acrylate, phenyl acrylate, acrylonitrile, styrene, glycidyl methacrylate, 2-hydroxyethyl methacrylate, hydroxypropyl methacrylate (including all isomers), hydroxybutylmethacrylate (including all isomers), N,N-dimethyl aminoethyl methacrylate, N,N-diethyl aminoethyl methacrylate, triethyleneglycol methacrylate, itaconic anhydride, itaconic acid, glycidyl acrylate, 2-hydroxyethyl acrylate (2HEA), hydroxypropyl acrylate (including all isomers), hydroxybutyl acrylate (including all isomers), N,N-dimethyl aminoethyl acrylate, N,N-diethyl aminoethyl acrylate, triethyleneglycol acrylate, methacrylamide, N-methyl acrylamide, N,N-dimethyl acrylamide, N-t-butyl methacrylamide, N-n-butyl methacrylamide, N-methylol acrylamide, N-ethylol acrylamide, 4-acryl morpholin, vinylbenzoic acid (including all isomers), diethyl aminostyrene (including all isomers), α-methyl vinylbenzoic acid (including all isomers), diethyl amino α-methyl styrene (including all isomers), p-vinylbenzene sulfonic acid, p-vinylbenzene sulfonic acid sodium salt, trimethoxysilylpropyl methacrylate, triethoxysilylpropyl methacrylate, tributoxysilylpropyl methacrylate, dimethoxymethyl silylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, diisopropoxysilylpropyl acrylate, maleic anhydride, N-phenyl maleimide, N-butyl maleimide, butadiene, isoprene, chloroprene, ethylene, vinyl acetate and combinations thereof may be mentioned, but the present invention is by no means limited to these examples.

The preferable monomers in the production process of the polymer according to the present invention, are those selected from substituted or unsubstituted styrene, substituted or unsubstituted alkyl acrylate, substituted or unsubstituted alkyl methacrylate, acrylonitrile, N-alkyl alkylamide, N-alkyl methacrylamide, N,N-dialkyl acrylamide, N,N-dialkyl methacrylamide, isoprene, butadiene, ethylene, vinyl acetate and combinations thereof may be mentioned.

In the production process of the polymer according to the present invention, by controlling the type or addition method of the monomer, it is possible to produce a homopolymer, random copolymer or block copolymer.

Further, in the production process of the polymer according to the present invention, it is possible to use one or more types of monomers to produce a polymer represented by the following formula (b):

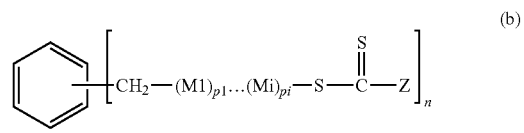

(b)

In the formula (b), i is 2 or more, n is 1 to 6, Mi is repeating units derived from the same or different radical polymerizable monomer and pi is each independently 1 or more and showing a degree of polymerization of the repeating units Mi. Z is an organic group selected from substituted or unsubstituted aryl, substituted or unsubstituted heteroaryl.

When utilizing a polymer represented by the above formula (b) for a composition for adhesive use or bonding use, from the viewpoint of the cohesion strength or bonding strength, it is preferable to use a polymer represented by the (b), wherein n is 4 to 6. More preferably, it is preferable to use a polymer represented by (b) where n is 5 or 6, particularly preferable to use a polymer represented by (b), where said n is 6. Due to this, the composition using the polymer according to the present invention exhibits a high cohesion strength and gives a high adhesive strength or high bonding strength compared with a composition using a linear polymer of the same molecular weight.

As the example of the radical polymerizable monomer generating the repeating units Mi in the above formula (b), a monomer usable in the above-mentioned production process of the polymer according to the present invention may be mentioned, but the invention is not limited to this example.

As examples of the radical generator usable in the production process of the polymer according to the present invention, 2,2'-azobis(isobutyronitrile) (AIBN), 4,4'-azobis(4-cyanopentanoic acid), 2-(t-butylazo)-2-cyanopropane, 2,2'-azobis(isobutylamide)dihydrate, 2,2'-azobis(2-methyl propane), 2,2'-azobis[2-(5-methyl-2-imidazolin-2-yl)propane]dihydrochloride, 2,2'-azobis[2-(2-imidazolin-2-yl)propane]dihydrochloride, 2,2'-azobis[2-(2-imidazolin-2-yl)propane]disulfate dihydrate, 2,2'-azobis(2-methylpropionamide)dihydrochloride, 2,2'-azobis[N-(2-carboxyethyl)-2-methylpropionamidine]tetrahydrate, 2,2'-azobis[2-(3,4,5,6-tetrahydropyrimidin-2-yl)propane] dihydrochloride, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis{2-methyl-N-[1,1-bis (hydroxymethyl)-2-hydroxyethyl]propionamide}, 2,2'-azobis{2-methyl-N-[2-(1-hydroxybutyl)]propionamide}, 2,2'-azobis[2-methyl-N-(2-hydroxyethyl)propionamide], 2,2'-azobis(4-methoxy-2,4-dimethylvaleronitrile), 2,2'-azobis(2,4-dimethylvaleronitrile), dimethyl 2,2-azobis(2-methylpropionate), 2,2'-azobis(2-methylbutyronitrile), 1,1'-azobis(cyclohexane-1-carbonitrile), 2,2'-azobis[N-(2-propenyl)-2-methylpropionamide], 1-[(cyano-1-methylethyl)azo]formamide, 2,2'-azobis(N-butyl-2-methylpropionamide), 2,2'-azobis(N-cyclohexyl-2-methyl propionamide), t-butyl peroxyacetate, t-butyl peroxybenzoate, t-butyl peroxyoctanoate, t-butyl peroxyneodecanoate, t-butyl peroxyisoacetate, t-amyl peroxypivalate, t-butyl peroxypivalate, diisopropyl peroxydicarbonate, dicyclohexyl peroxyldicarbonate, dicumyl peroxide, dibenzoyl peroxide, dilauroyl peroxide, potassium peroxydisulfate, ammonium peroxydisulfate, di-t-butyl hyponitrite, dicumyl hyponitrite, etc. may be mentioned, but the invention is not limited to these examples.

In the production process of the polymer according to the present invention, an organic solvent can be used as desired. As the organic solvent which can be used in the production process of the polymer according to the present invention, methanol, ethanol, n-propanol, i-propanol, n-butanol, i-butanol, sec-butanol, t-butanol, dipropyleneglycol dimethylether, propyleneglycol monomethyl ether, propyleneglycol monoethylether, ethyleneglycol monomethyl ether acetate, ethyleneglycol monoethyl ether acetate, diethyleneglycol monomethyl ether acetate, diethyleneglycol monoethyl ether acetate, propyleneglycol monomethyl ether acetate, propyleneglycol monoethyl ether acetate, dipropyleneglycol monomethyl ether acetate, dipropyleneglycol monoethyl ether acetate, diethyleneglycol dimethyl ether, diethyleneglycol methylethyl ether, diethyleneglycol diethyl ether, dipropyleneglycol dimethyl ether, dipropyleneglycol methylethyl ether, dipropyleneglycol diethyl ether, tetrahydrofuran (THF), dimethylsulfoxide, dimethylformamide, acetone, acetonitrile, benzene, toluene, xylene, etc. may be mentioned, but the invention is not limited to these examples. Among these, ethyl acetate, methyl ethyl ketone (MEK), toluene or another organic solvent which is used in normal solution radical polymerization is preferable.

EXAMPLES

Synthesis Example 1

Synthesis of RAFT Agent 1

The inside of a 100 ml three-necked round-bottom flask, to which a dropping funnel is connected, was replaced with nitrogen, then a 1.0M diethyl ether solution (22 ml) of benzyl magnesium chloride was added and the mixture was cooled in an ice bath to 0° C. To this, carbon disulfide (1.32 ml) was dropped from a dropping funnel over 10 minutes, then the mixture was stirred at 0° C. for 4.5 hours. Thereafter, 30 ml of water was added, the mixture was returned to room temperature, the mixture was then washed with diethyl ether (total 100 ml) 2 times. Diethyl ether (50 ml) and 30% HCl (5 ml) were added and the product was extracted from the organic layer. Thereafter, the product was washed with water (total 150 ml) 3 times. The diethyl ether layer was concentrated to obtain phenylethyl dithiocarboxylic acid (1.86 g).

The phenylethyl dithiocarboxylic acid (1.86 g) obtained above was added to a 200 ml Erlenmeyer flask, potassium hydroxide (0.62 g) dissolved in 2 ml of water was added, and the resultant mixture was stirred. Thereafter, the water was distilled off to obtain a potassium salt of phenylethyl dithiocarboxylic acid. The inside of the Erlenmeyer flask was replaced with nitrogen, then 15 ml of THF was added. Further, hexakis (bromomethyl)benzene (1.17 g) mixed with 55 ml of THF was added dropwise over 25 minutes. Thereafter, the mixture was stirred at room temperature for 1 hour. As the reaction proceeded, the solution changed from red to yellow. After the end of the reaction, the THF was distilled off, water 30 ml was added, then toluene (total 90 ml) was used to extract the product three times. Next, the toluene layer was washed with water (total 150 ml) three times. The toluene layer was concentrated to obtain a RAFT agent 1 (1.20 g).

Figure 2:
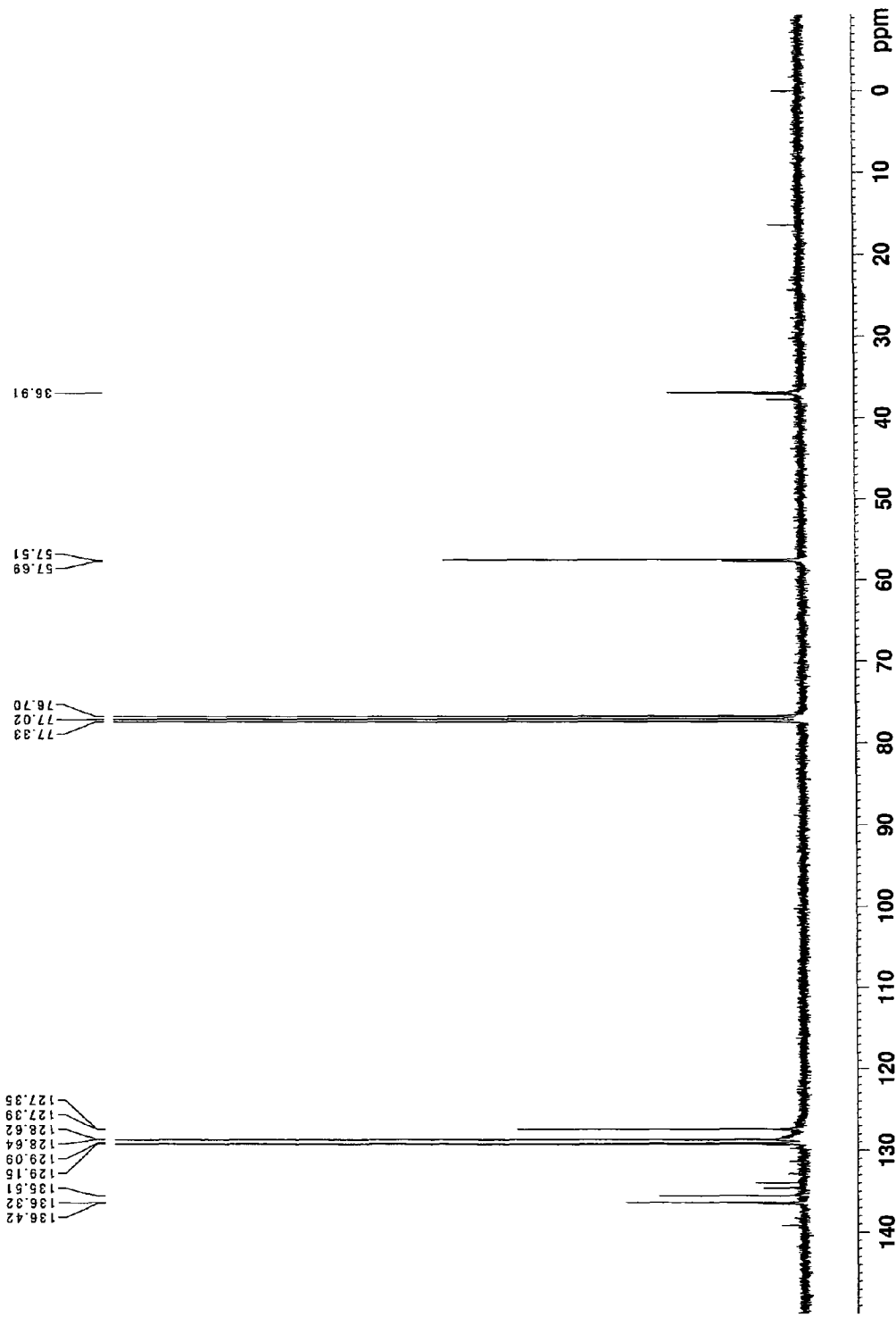
FIG. 2 is the results of $^{13}$CNMR measurement of a RAFT agent 1 obtained in Synthesis Example 1.

Confirmation of Structure of RAFT Agent 1 (see FIG. 1 and FIG. 2)

$^1$H-NMR(CDCl$_3$) (ppm): 4.1 (s, 12H), 4.2 (s, 12H), 7.2-7.4 (m, 30H)

$^{13}$C-NMR(CDCl$_3$) (ppm):36.9, 57.5, 127.4, 128.6, 129.1, 135.5, 136.3

Polymerization Example 1

A 500 ml Erlenmeyer flask was charged with, as a radical polymerization initiator, 2,2'-azobis(isobutyronitrile) (hereinafter, "AIBN") (70 mg) and a RAFT reagent 1 (230 mg), then the inside was replaced with nitrogen. To this, butyl acrylate (hereinafter "BA") (46 ml: 320 mmol), from which the polymerization inhibitor was removed by the purification of distillation, and toluene (26 ml) were added, then nitrogen was blown in for 10 minutes. Thereafter, the Erlenmeyer flask was placed in a 60° C. oil bath and a reaction was effected for 20 hours.

As the reaction progressed, it was confirmed that the viscosity of the reaction solution was increased. The conversion rate of BA determined by gas chromatography was 90%, Mw was 100,000 and Mw/Mn was 2.0.

Thereafter, 2-hydroxyethyl acrylate (hereinafter, "2HEA") (6.3 ml: 55 mmol) was added, the mixture was stirred until becoming homogeneous, then nitrogen was blown in for 10 minutes. Next, the Erlenmeyer flask was placed in a 60° C. oil bath and a reaction was effected for 20 hours. The product was returned to room temperature, then analyzed. The 2HEA conversion rate determined by gas chromatography was 99%, the Mw found by GPC was 110,000, and the Mw/Mn was 2.0.

Polymerization Example 2

A 100 ml Erlenmeyer flask was charged with, as a radical polymerization initiator, AIBN (1.4 mg) and a RAFT agent 1 (4.6 mg), then the inside was replaced with nitrogen. To this, BA (4.6 ml: 32 mmol), from which the polymerization inhibitor was removed by the purification of distillation, and toluene (2.6 ml) were added, then nitrogen was blown in for 10 minutes. Next, the Erlenmeyer flask was placed in a 60° C. oil bath and a reaction was effected for 20 hours.

As the reaction progressed, the increase in the viscosity of the reaction solution was confirmed. The BA conversion rate determined by gas chromatography was 90%, the Mw found by GPC was 660,000 and the Mw/Mn was 3.5.

Thereafter, 2HEA (0.63 ml: 5.5 mmol) was added and the mixture stirred until becoming homogeneous, then nitrogen was blown in for 10 minutes. Next, the Erlenmeyer flask was placed in a 60° C. oil bath and a reaction was effected for 20 hours. The product was returned to room temperature, then analyzed. The 2HEA conversion rate determined by gas chromatography was 99%, the Mw found by GPC was 790,000 and the Mw/Mn was 4.0.

Polymerization Example 3

A 100 ml Erlenmeyer flask was charged with, as a radical polymerization initiator, AIBN (140 mg) and a RAFT agent 1 (460 mg), then the inside was replaced with nitrogen. To this, BA (4.6 ml: 32 mmol), from which the polymerization inhibitor was removed by purification of distillation and toluene (2.6 ml) were added, then nitrogen was blown in for 10 minutes. Next, the Erlenmeyer flask was placed in a 60° C. oil bath and a reaction was effected for 20 hours. As the reaction progressed, an increase in viscosity of the reaction solution was confirmed. The BA conversion rate confirmed by gas chromatography was 90%, the Mw found by GPC was 8,000, and the Mw/Mn was 1.5.

Thereafter, 2HEA (0.63 ml: 5.5 mmol) was added, then the mixture was stirred until becoming homogeneous. Next, nitrogen was blown in for 10 minutes, then the Erlenmeyer flask was placed in a 60° C. oil bath and a reaction was effected for 20 hours. The product was returned to room temperature, then analyzed. The 2HEA conversion rate determined by gas chromatography was 99%, the Mw found by GPC was 10,000 and the Mw/Mn was 1.5.

Polymerization Example 4

A 100 ml Erlenmeyer flask was charged with, as a radical polymerization initiator, AIBN (45 mg) and a RAFT agent 1 (160 mg), then the inside was replaced with nitrogen. To this, butyl methacrylate (hereinafter, "BMA") (4.6 ml: 29 mmol), from which the polymerization inhibitor was removed by purification of distillation, and toluene (2.6 ml) were added, then nitrogen was blown in for 10 minutes. Next, the Erlenmeyer flask was placed in a 60° C. oil bath and a reaction was effected for 20 hours. As the reaction progressed, an increase in viscosity of the reaction solution was confirmed. The BMA conversion rate determined by gas chromatography was 90%, the Mw found by GPC was 116,000 and the Mw/Mn was 1.9.

Thereafter, methyl methacrylate (hereinafter, "MMA") (3.1 ml: 29 mmol) was added and the mixture stirred until becoming homogeneous. Next, nitrogen was blown in for 10 minutes, then the Erlenmeyer flask was placed in a 60° C. oil bath and a reaction was effected for 20 hours. The product was returned to room temperature, then analyzed. The MMA conversion rate, determined by gas chromatography, was 93%, the Mw found by GPC was 135,000 and the Mw/Mn was 1.8.

Thermal Analysis of Polymer

Figure 3:
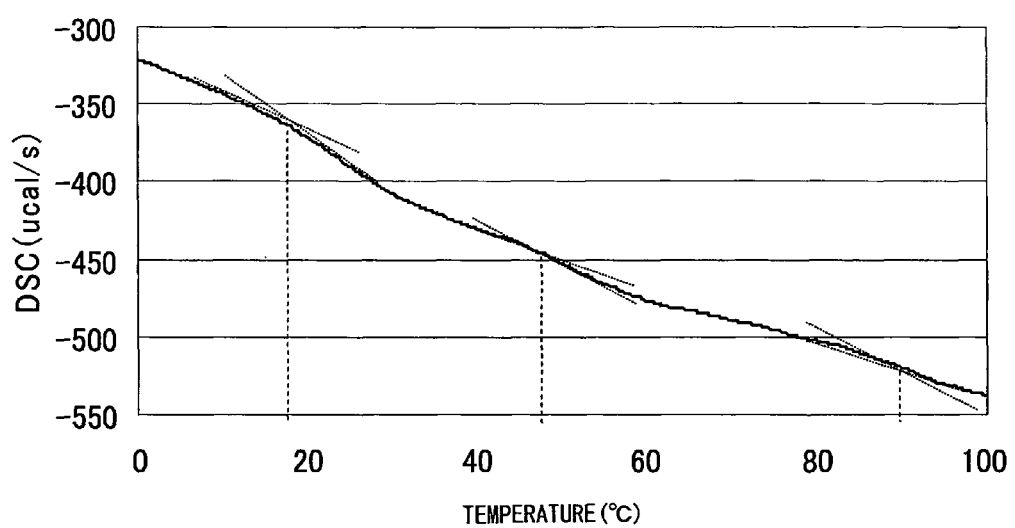
FIG. 3 is the results of measurement of the glass transition point by differential scan calorimetry (DSC) of the polymer obtained in Polymerization Example 4.

The polymer obtained in Polymerization Example 4 was measured for the glass transition point by differential scan calorimetry (DSC). As a result, peaks of the glass transition point were confirmed at two locations of 20° C. and 90° C. (see FIG. 3). From this, it was confirmed that the polymer was a block copolymer.

Comparative Example 1

A 500 ml Erlenmeyer flask was charged with, as a radical polymerization initiator, AIBN (500 mg), then the inside was replaced with nitrogen. To this, BA (46 ml: 320 mmol), from which the polymerization inhibitor was removed by purification of distillation, 2HEA (6.3 ml: 55 mmol), ethyl acetate (44 ml) and toluene (11 ml) were added, then nitrogen was blown in for 10 minutes. Next, the Erlenmeyer flask was placed in an oil bath and a reaction was effected for 6 hours under reflux. As the reaction progressed, an increase in viscosity of the reaction solution was confirmed. The product was returned to room temperature, then analyzed. The Mw found by GPC was 110,000, while the Mw/Mn was 2.5.

The results of the Polymerization Examples 1 to 4 and Comparative Example 1 are shown together in the following Table I.

TABLE I

| | Polymerization Example 1 | Polymerization Example 2 | Polymerization Example 3 | Polymerization Example 4 | Comparative Example 1 |
|---|---|---|---|---|---|
| Composition (molar ratio) | BA/2HEA 100/20 | BA/2HEA 100/20 | BA/2HEA 100/20 | BMA/MMA 50/50 | BA/2HEA 100/20 |
| Mw($\times 10^3$) | 110 | 790 | 10 | 135 | 110 |
| Mw/Mn | 2.0 | 4.0 | 1.5 | 1.8 | 2.5 |

Preparation of Adhesive

The polymer obtained in Polymerization Example 1 in 10 g, as a diluent, 10 g of ethyl acetate, and, as a cross-linking agent, 0.1 g of Duranate D-201 made by Asahi Kasei Chemicals were mixed to obtain a adhesive solution. This was coated on a 38 μm thick PET separator using an applicator to give a film thickness, after drying, of 25 μm. This was dried at 100° C. for 1 minute, then pasted on a 50 μm untreated PET. The two were cured at 23° C. at a humidity of 65% for 7 days to obtain a adhesive sheet 1.

Similarly, 10 g of the polymer obtained in Comparative Example 1, as a diluent, 10 g of ethyl acetate, and, as a cross-linking agent, 0.1 g of Duranate D-201 made by Asahi Kasei Chemicals were mixed to obtain a adhesive solution. This was coated on a 38 μm thick PET separator using an applicator to give a film thickness, after drying, of 25 μm. This was dried at 100° C. for 1 minute, then pasted on a 50 μm untreated PET. The two were cured at 23° C. at a humidity of 65% for 7 days to obtain a adhesive sheet 2.

The adhesive sheets 1 and 2 prepared above were measured for bonding properties in accordance with JIS Z 0237 (adhesive strength, holding force and ball tack). The results are shown in Table II. As a result, the adhesive sheet 1 using the polymer of the present invention was superior in adhesive strength, compared with the adhesive sheet 2 using a linear polymer. Further, the adhesive sheet 1 using the polymer of the present invention "shifted" in a 80° C., 10 minute holding force test. On the other hand, the adhesive sheet 2 using a linear polymer was tested by a 80° C., 10 minute holding force test, whereupon the sheet ended up falling off.

TABLE II

|  | Adhesive sheet 1 | Adhesive sheet 2 |
| --- | --- | --- |
| Adhesive strength (N/10 mm) | 6 | 4 |
| Holding force (80° C.) | No shift | Falls off after 10 minutes |
| Ball tack (30°) | 6 | 6 |

Measurement Method

Adhesive strength: The adhesive sheet 1 was cut to a 25 mm width, the separator was peeled off and the remainder was pasted to a SUS#304 sheet in a 23° C., 65% humidity atmosphere using a 2 kg roller. 30 minutes after pasting, a Tensilon was used to peel this off from the SUS#400 sheet under conditions of a peeling angle of 180° and a peeling speed of 300 mm/min. The peeling strength at this time was found as the adhesive strength.

Holding force: The adhesive sheet 1 was cut to a 25 mm width×75 mm length, the separator was peeled off, and the remainder was pasted on to a SUS#304 sheet in a 23° C., 65% humidity atmosphere using a 2 kg roller to exactly an area of 25 mm×25 mm. One hour after pasting, the result was allowed to stand for 1 hour in a 80° C. thermostatic tank, then a 1 kg weight was attached to the end of the sample at the side not attached to the SUS sheet. The shift of the sample from the SUS sheet after 24 hours was measured.

Ball tack (30°): Measured in accordance with J. Dow Method.

The invention claimed is:

1. A thiocarbonyl compound represented by the following formula (a):

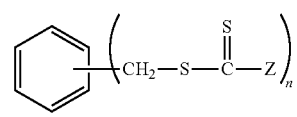

in which formula (a), n is 2 to 6, and Z is an organic group selected from a substituted or unsubstituted aryl, a substituted or unsubstituted heteroaryl.

2. A process for producing a polymer characterized by comprising the following (1) to (3) in a reaction system:
(1) radical polymerizable monomer
(2) radical generator
(3) thiocarbonyl compound represented by the following formula (a)

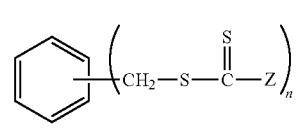

in which formula (a), n is 2 to 6, and Z is an organic group selected from a substituted or unsubstituted aryl, a substituted or unsubstituted heteroaryl.

3. A polymer represented by the following formula (b):

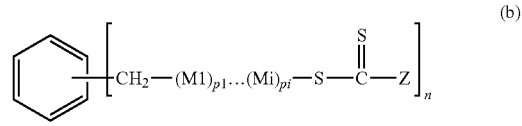

in which formula (b), i is 2 or more, n is 2 to 6, Mi is repeating units derived from the same or different radical polymerizable monomer, and pi is independently 1 or more and showing a degree of polymerization of the repeating units Mi, Z is an organic group selected from substituted or unsubstituted aryl, substituted or unsubstituted heteroaryl.

4. A polymer as claimed in claim 3, characterized in that the radical polymerizable monomer is selected from substituted or unsubstituted styrene, substituted or unsubstituted alkyl acrylate, substituted or unsubstituted alkyl methacrylate, acrylonitrile, N-alkyl alkylamide, N-alkyl methacrylamide, N,N-dialkyl acrylamide, N,N-dialkyl methacrylamide, isoprene, butadiene, ethylene, vinyl acetate and combinations thereof.

5. A composition for adhesive use or bonding use characterized by comprising the polymer according to claim 3 or 4.

* * * * *